(No Model.)

A. E. SMITH.
Axle for Vehicles.

No. 240,779. Patented April 26, 1881.

WITNESSES
Thos A. Connery
Geo. L. Cummins

INVENTOR.
Alfred E. Smith

UNITED STATES PATENT OFFICE.

ALFRED E. SMITH, OF BRONXVILLE, NEW YORK.

AXLE FOR VEHICLES.

SPECIFICATION forming part of Letters Patent No. 240,779, dated April 26, 1881.

Application filed December 9, 1880. (No model.)

*To all whom it may concern:*

Be it known that I, ALFRED E. SMITH, of Bronxville, in the county of Westchester and State of New York, have invented new and useful Improvements in Axles for Vehicles, of which the following is a specification.

This invention pertains to that class of axles for vehicles which have metal boxes in the form of sleeves fitting over long bearings on the spindles; and the invention consists in forming the spindle with a conical-shaped shoulder near its outer end, or just inside of the outer end of the box, to serve as a bearing for the end thrust of the box, and then forming the outer end of the box with a corresponding flange to work against said shoulder and be held thereby, between it and the nut on the outer end, as will hereinafter appear.

Figure 1:
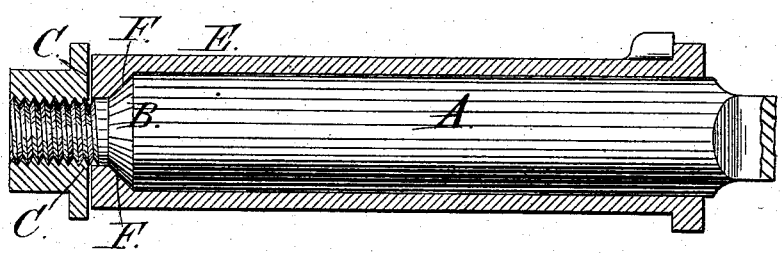
Figure 2:
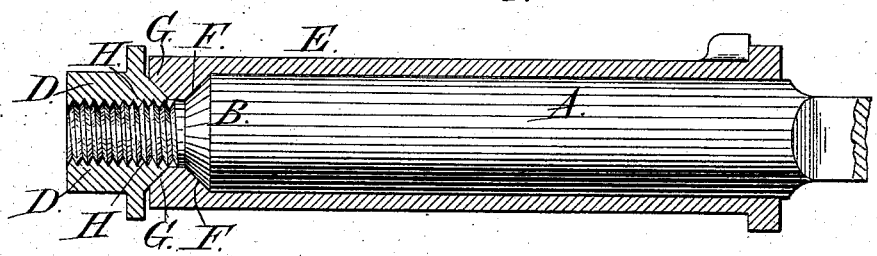

In the drawings, Figures 1 and 2 are longitudinal sections of the boxes, and the nuts for holding them on the spindles, which are shown complete.

At A is represented the spindle of a vehicle, formed of a single rod or bar of metal, and which is preferably made of cylindrical form, as it is cheaper and quite as good for a bearing-surface; but near the outer end of said spindle a conical shoulder, as at B, is formed by turning down the end to a proper size to receive the nut, which may be of the ordinary form, with a plain face, as at C, or with a conical face, as at D in Fig. 2. Said shoulder is preferably made at an angle of forty-five degrees, as shown in the drawings, though this may be varied somewhat, if desired.

The box shown at E in Fig. 1 is made to correspond to the said spindle, having an internal flange at F, the inner face of which fits upon the face of the shoulder B, and around the shank which supports the nut, to form a close joint around the outer end of the shoulder, so that when the nut is screwed on said flange on the box is clamped between the shoulder and the nut at the outer end of the spindle, instead of between a collar on the rear end of the spindle, against which the rear end of the box works, and the nut on the outer end, as is commonly the case.

Instead of the outer end of the box being turned off square to receive a plain-faced nut, as shown in Fig. 1, it may be formed with a cone-shaped recess in the end of the box, as at G, so that the inner face of said flange F will be V-shaped, and the face of the nut will correspond to said recess, or be cone-shaped, as shown at H, Fig. 2, and these inclinations of the surfaces may be varied as desired, but an angle of forty-five degrees is preferred.

It is evident that recesses may be formed on the interior of the box or exterior of the spindle for oil-receptacles, if desired, and as is now commonly done; but the bearing-surfaces are to that extent reduced, and with the construction above described it will be seen that a few drops of oil, which may be easily introduced at the outer end of the box, will soon descend around the interior of the flange and against the shoulder on the end of the spindle, and so be held from running off the point, either when at rest or in motion.

I therefore claim—

1. A spindle for vehicle-axles, formed with a conical shoulder near its outer end, in combination with a box having a corresponding flange or internal rib to fit upon said shoulder and around the shank that holds the nut, and either with or without a plain-faced nut, as hereinbefore set forth.

2. The combination of the spindle A, having a conical shoulder near its outer end, with a corresponding box, and a conical-faced nut fitting upon the spindle and into a cone-shaped recess in the end of the box, as hereinbefore set forth.

In testimony whereof I have hereunto set my hand and seal in the presence of two subscribing witnesses.

ALFRED E. SMITH. [L. S.]

Witnesses:
EUGENE N. ELIOT,
RICHARD J. CARTER.